United States Patent [19]
Mabee et al.

[11] 3,739,175
[45] June 12, 1973

[54] PHOTO SENSITIVE STAR SENSING ARRAY

[75] Inventors: Crawford D. Mabee, Largo; Alvin M. Turner, Clearwater, both of Fla.

[73] Assignee: Honeywell, Inc., Minneapolis, Minn.

[22] Filed: Jan. 6, 1971

[21] Appl. No.: 104,358

[52] U.S. Cl.......... 250/203 R, 250/211 R, 244/3.18
[51] Int. Cl............................................... G01j 1/20
[58] Field of Search................ 250/203 R, 203 CT, 250/211 R, 211 K, 83.3 H; 244/3.18

[56] References Cited
UNITED STATES PATENTS

| | | | |
|---|---|---|---|
| 3,185,852 | 5/1965 | Lewis | 250/220 M X |
| 3,469,102 | 9/1969 | Huvers | 250/235 X |
| 3,535,527 | 10/1970 | Beall, Jr. | 250/202 X |
| 3,388,629 | 6/1968 | Brenholdt et al. | 250/203 R X |
| 3,205,365 | 9/1965 | Jones | 250/211 K |
| 3,222,531 | 12/1965 | Morrison | 250/211 K |
| 3,033,073 | 5/1962 | Shuttleworth | 250/211 K |
| 3,307,164 | 2/1967 | Zimmer | 250/236 X |

Primary Examiner—Walter Stolwein
Attorney—Charles J. Ungemach, Ronald T. Reiling and James A. Phillips

[57] ABSTRACT

A photosensitive detector for mounting in the focal plane of a star tracking telescope of the gradient detecting type. The detector includes two sets of long, thin photocells set at an angle to each other so that azimuth information as well as elevation information can be obtained with a single sweep in elevation as the image of a predetermined star traces a path across the photocells.

1 Claim, 5 Drawing Figures

INVENTOR.
CRAWFORD D. MABEE
ALVIN M. TURNER
BY Charles J. Ungemach
ATTORNEY

PHOTO SENSITIVE STAR SENSING ARRAY

BACKGROUND OF THE INVENTION

The invention pertains generally to star tracking telescopes and specifically to a photosensitive detector array for use with a star tracking telescope of the gradient detecting type.

In prior art detectors azimuth information is normally obtained by breaking up the detector into a number of small segments based on the required resolution in azimuth and the field of view required.

SUMMARY

The detector of this invention, in its simplest form, comprises two long, narrow one-element photocells arranged in a diverging pattern. The star image is caused to be swept in elevation across the array at a predetermined rate which causes signal pulses to be generated. Elevation and azimuth error correction signals are derived from the signal pulses.

DESCRIPTION OF THE PREFERRED EMBODIMENT

Figure 1:
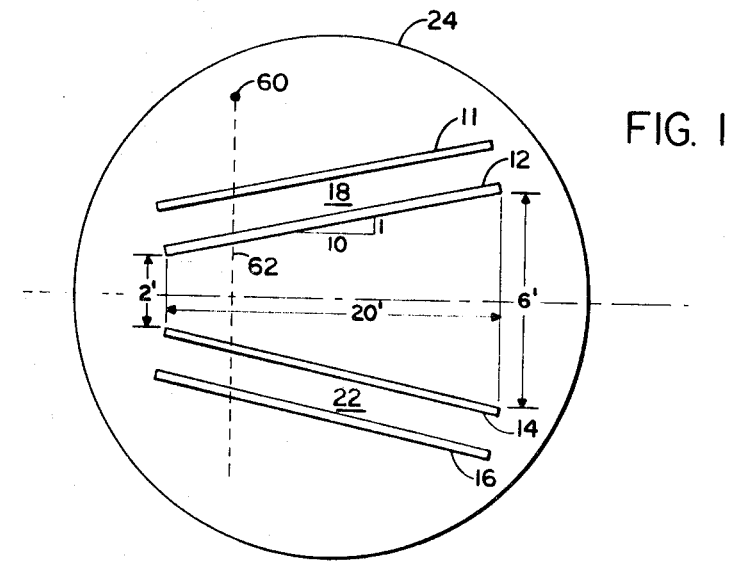
FIG. 1 is a front view of the star sensing array.

The star sensing array of FIG. 1 comprises four photo cells 11, 12, 14 and 16. Cells 11 and 12 form a cell pair 18 and cells 14 and 16 form a cell pair 22. Cell pairs 18 and 22 are mounted on a plate 24. Cells 11 and 12 in cell pair 18 are parallel as are cells 14 and 16 in cell pair 22. Cells pairs 18 and 22 however are not parallel and diverge from each other in going from left to right. As shown in FIG. 1 the vertical spacing between cell pair 18 and cell pair 22 on the left hand side is two minutes of arc whereas the spacing on the right hand side is six minutes of arc. Cell pairs 18 and 22 have a horizontal component of length of twenty minutes of arc. From these dimensions it can be determined that the cell pairs have a slope of one vertical unit per ten horizontal units.

Figure 2:
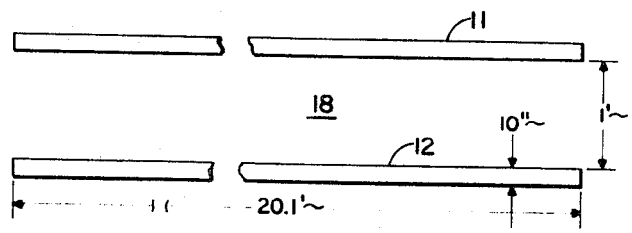
FIG. 2 shows the dimension of a pair of typical photo sensitive cells.

FIG. 2 gives the dimensions of a typical cell pair. Cell pairs 18 and 22 are identical so only cell pair 18 is shown in FIG. 2. The individual cells are ten seconds of arc wide and 20.1 seconds of arc long. Cells 11 and 12, parallel to each other, are spaced apart by a distance of one minute of arc. It can be seen from this that the individual cells in a typical pair are relatively long and narrow.

The particular cell pattern or array and the dimensions of the cells shown in FIG. 1 and FIG. 2 are not meant to be limiting. The geometry and the dimensions will depend upon the particular application.

Figure 3:
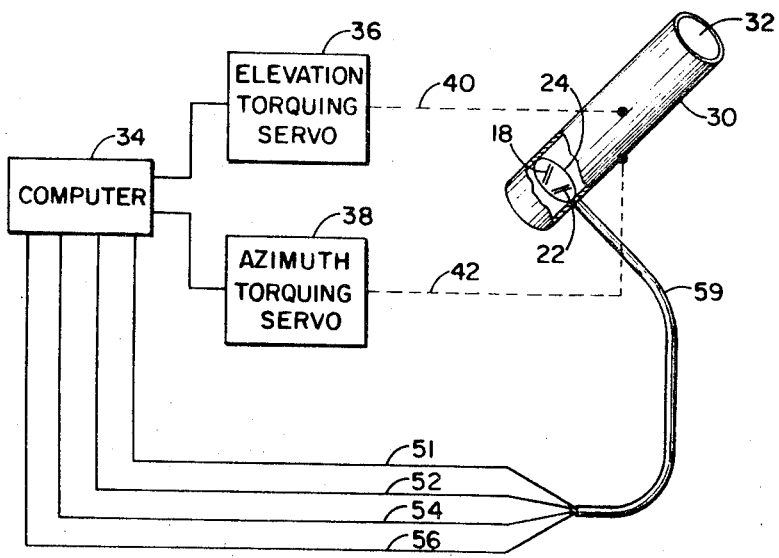
FIG. 3 is a block diagram of a star tracking system.

The star tracking system of FIG. 3 includes a telescope 30 with an objective lens 32, a digital computer 34, an elevation torquing servo 36, and an azimuth torquing servo 38. The output of servo 36, present on a drive means shown as dashed line 40, is connected to telescope 30 and drives it in elevation. The output of servo 38, present on a drive means shown as a dashed line 42, is also connected to telescope 30 and drives it in azimuth. Plate 24, with cell pairs 18 and 22, is mounted in the focal plane of telscope 30. Cells 11 and 12 of cell pair 18 and cells 14 and 16 of cell pair 22 develop signals on lines 51, 52, 54 and 56 in a cable 57 which is connected to computer 34.

Figure 5:
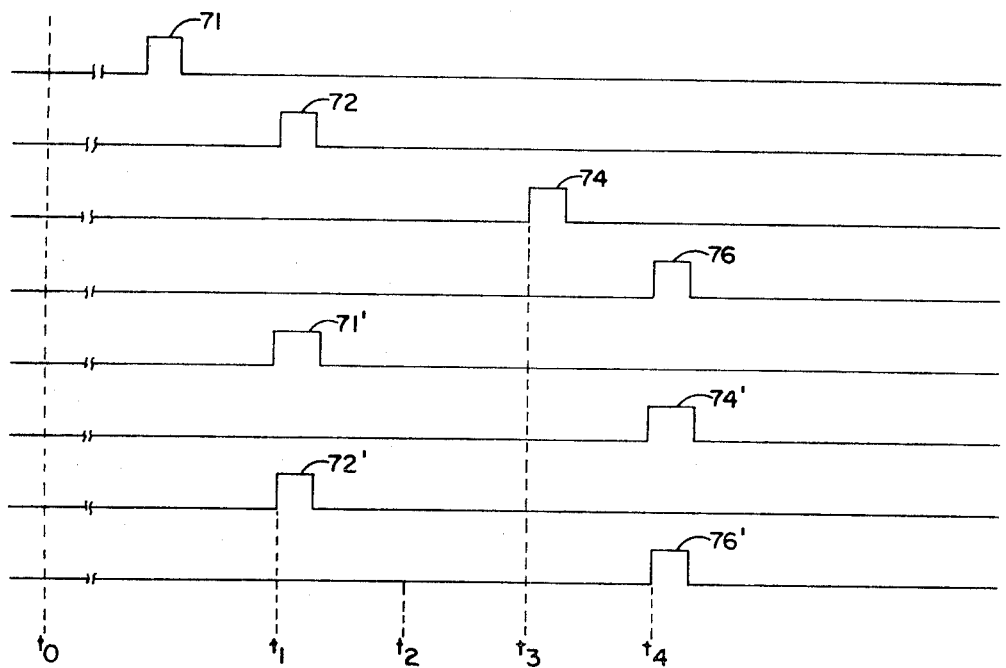

The system of FIG. 3 is used in determining the elevation and azimuth of a selected star. Computer 34 calculates the approximate pointing angle, in elevation and azimuth, to the desired star. Torquing servo 36 and torquing servo 38 act upon the information contained in the approximate pointing angle found by computer 34 and position telescope 30 accordingly in elevation and azimuth. Telescope 30 is now pointed in such a way that the image of the desired star falls on plate 24 located in the focal plane of telescope 30. Referring back to FIG. 1 the star image is shown as a point 60 near the top of plate 24. (Whether the image occurs at the top or bottom of plate 24 is arbitrary.) With telescope 30 positioned at the approximate pointing angle to the selected star, elevation servo 36 is commanded to sweep telescope 30 at a predetermined rate in the elevation direction. When this occurs star image 60 traces a path, shown as dashed line 62, on plate 24 crossing cells 11, 12, 14 and 16. Referring to FIG. 5 the passage of the star image over the cells causes pulses 71, 72, 74 and 76 to be developed by the cells. Thses pulses are present on lines 51, 52, 54, and 56 in FIG. 3 and are received by computer 34. In computer 34 pulse 71 is delayed and widened somewhat, as is pulse 74. In FIG. 5 the delay and widening of pulse 71 result in pulse 71' and the delay and widening of pulse 74 results in pulse 74'. Pulses 71' and 74' act as gating signals for pulses 72 and 76 respectively. The gating of pulse 72 results in pulse 72' and the gating of pulse 76 results in pulse 76'. In FIG. 5 time $t_0$ starts after telescope 30 has been positioned at the approximate pointing angle and elevation servo 36 is commanded to move telescope 30 at a known rate in elevation. Computer 34 measures the time $t_1$ to the leading edge of pulse 72', the time $t_3$ to the leading edge of pulse 74 and the time $t_4$ to the leading edge of pulse 76'. The point in time midway between time $t_3$ and time $t_1$ is denoted time $t_2$. Time $t_2$ corresponds to that time at which the star image 60 passes a point midway between cell pairs 18 and 22. By computing the time period $(t_2-t_0)$ and knowing the rate at which servo 36 is sweeping telesocpe 30 in elevation, an elevation correction signal can be computed. This error signal corresponds to the amount of elevation which must be subtracted from the elevation information contained in the approximate pointing signal to arrive at the true elevation of the selected star. The azimuth correction signal is a function of the time period $(t_4 - t_1)$. Computing this time and knowing the rate of elevation sweep the azimuth correction can be computed. The azimuth correction increases as the path of the star image moves toward the right hand side of plate 24. The signal corresponding to the azimuth correction is added to or subtracted from the approximate azimuth contained in the approximate pointing signal and in this way the true azimuth is arrived at.

Thus by measuring the time it takes to move the image from point 60 along path 62 to a point midway between cell pairs 18 and 22 and knowing the rate of movement, the angular displacement can be computed. The displacement here is the angular distance between point 60 and the point on path 62 midway between cell pairs 18 and 22, and corresponds to the elevation error. By measuring the time it takes the image to travel between cells 12 and 14 and knowing the rate of travel, the angular distance between the cells on the image path can be computed. Knowing the geometry of the array and knowing the distance, the azimuth of the crossing can be determined. This corresponds to the azimuth error and it is with reference to a specific point, e.g., the middle of the pattern.

Figure 4:
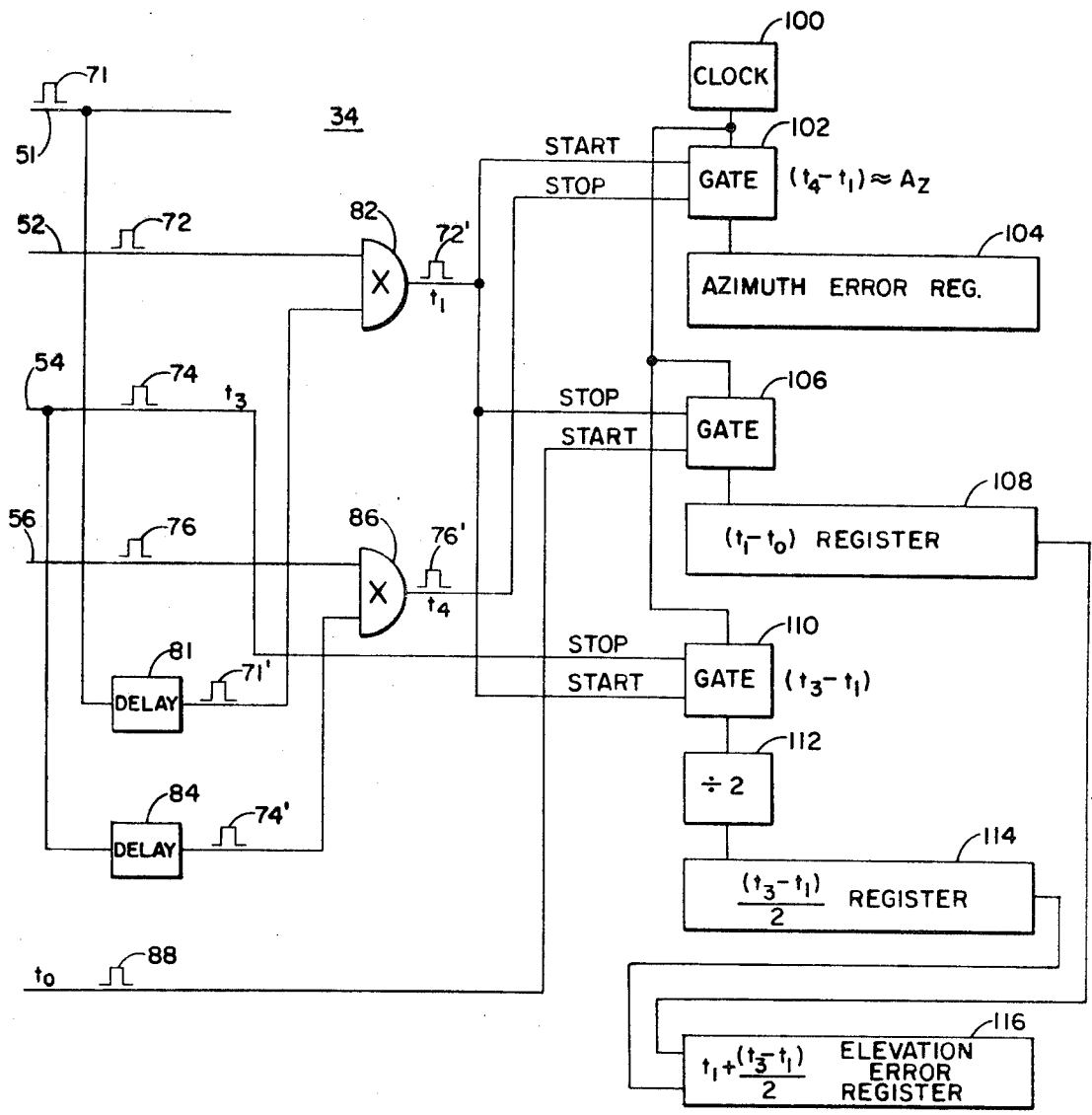
FIG. 4 is a block diagram of a portion of a computer which may be used in the system of FIG. 3; and, FIG. 5 is a timing diagram of the signals generated by the star sensing array.

That part of computer 34 which computes the azimuth and elevation error signals is shown in FIG. 4. The incoming pulses 71, 72, 74 and 76 are shown on lines 51, 52, 54 and 56 respectively. Pulse 71 is received by a delay circuit 81 which delays and widens pulse 71. The output of delay circuit 81 is shown as pulse 71'. Pulse 74 is received by delay circuit 84 where it is delayed and widened and the output of delay circuit 84 is shown as pulse 74'. Pulses 72 and 71' are received by an AND circuit 82 wherein pulse 72 is gated by pulse 71' and appears at the output of AND circuit 82 as pulse 72'. Pulse 72' corresponds to time $t_1$. Pulses 76 and 74' are received by an AND circuit 86 wherein pulse 76 is gated by pulse 74'. Pulse 76 is gated through AND circuit 86 and appears at the output thereof as gated pulse 76' corresponding to time $t_4$. The remainder of the computer shown in FIG. 4 uses pulses 72', 74, 76', and another pulse 88 corresponding to time $t_0$. The remainder of the computing circuit shown in FIG. 4 comprises a clock 100, gates 102, 106, and 110, registers 104, 108, 114, and 116, and a divide-by-2 circuit 112.

Pulses from clock 100 are applied to gate 102 as are pulses 72' and 76'. Pulse 72' opens gate 102 and pulses from clock 100 are passed through gate 102 to azimuth error register 104. Pulses continue to pass through gate 102 until pulse 76' is received by gate 102 which closes gate 102. The number of pulses accumulated in register 104 corresponds to the period of time $(t_4 - t_1)$ which corresponds to the azimuth error.

Pulses from clock 100 are also applied to a gate 106 along with pulses 72' and 88. Pulse 88 opens gate 106 and the pulses from clock 100 are passed through the gate and are accumulated in register 108 until pulse 72' is received by gate 106 closing it. The number of pulses accumulated in register 108 corresponds to the time period $(t_1 - t_0)$ which is used in a subsequent calculation.

Pulses from clock 100 are also applied to a gate 110 which is opened by pulse 72' and closed by pulse 74. From the time it is opened until the time it is closed gate 110 passes pulses from clock 100 and applies them to a divide-by-2 circuit 112. The output of circuit 112 is accumulated in register 114. The pulses accumulated in 114 correspond to the quantity $(t_3 - t_1)/2$. The quantity $(t_1 - t_0)$ stored in register 108 and the quantity $(t_3 - t_1)/2$ stored in register 114 are added and stored in register 116. The quantity $t_1 + (t_3 - t_1)/2$ in register 116 equals time $t_2$ which is indicative of the elevation error. The azimuth error signal stored in register 104 and the elevation error signal stored in register 116 are used to correct the approximate pointing angle which initiated the sequence.

The array of FIG. 1 shows an array with the cells arranged in pairs. This arrangement aids in picking up signals in noise. If noise is not a factor then a pattern with two single cells may be adequate.

Since may other obvious modifications will occur to those skilled in the art the invention is not to be limited except by the following claims.

We claim:

1. A system for determining the relative position of a star, comprising:
   a first pair of parallel, elongated light sensing means;
   a second pair of parallel, elongated light sensing means, divergingly spaced a predetermined amount from said first sensing means, both sensing means symmetrically spaced about a center line;
   means for developing a reference timing signal;
   means responsive to the reference timing signal for moving both pairs of the sensing means at a predetermined constant rate with respect to the star so that its image traces a straight path which crosses the center line at right angles and in one direction, causing first and second time signals to be generated when the image crosses the first and second sensing means, respectively;
   means for developing an azimuth signal, which is a function of the difference between the first and second time signals; and,
   means for developing an elevation signal, which is a function of the difference between the reference timing and first time signals and the difference between the first and second time signals.

* * * * *